(12) United States Patent
Schultze

(10) Patent No.: US 6,991,545 B2
(45) Date of Patent: Jan. 31, 2006

(54) BEARING ASSEMBLY FOR A JOURNAL, ESPECIALLY OF A CROSS MEMBER OF A UNIVERSAL JOINT

(75) Inventor: Hans-Jurgen Schultze, Bottrop (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 0 days.

(21) Appl. No.: 10/293,408

(22) Filed: Nov. 13, 2002

(65) Prior Publication Data

US 2003/0092495 A1 May 15, 2003

(30) Foreign Application Priority Data

Nov. 14, 2001 (DE) .................................. 101 55 761

(51) Int. Cl.
*F16D 3/41* (2006.01)

(52) U.S. Cl. .................................. 464/128; 464/132
(58) Field of Classification Search ................ 464/128, 464/130, 131, 132
See application file for complete search history.

(56) References Cited

U.S. PATENT DOCUMENTS

| | | | |
|---|---|---|---|
| 3,050,351 A | | 8/1962 | Kempf |
| 4,512,672 A | * | 4/1985 | Olschewski et al. ..... 464/131 X |
| 4,637,740 A | * | 1/1987 | Olschewski et al. ..... 464/132 X |
| 4,780,003 A | | 10/1988 | Bauer et al. |
| 4,810,233 A | * | 3/1989 | Crane et al. ................. 464/131 |
| 4,874,349 A | | 10/1989 | Gall |
| 4,875,787 A | * | 10/1989 | Bauer et al. ............. 464/128 X |
| 5,106,342 A | * | 4/1992 | Fisher ......................... 464/132 |
| 5,199,800 A | | 4/1993 | Bauer et al. |
| 5,769,723 A | | 6/1998 | Faulbecker et al. |
| 5,813,916 A | * | 9/1998 | Lentini et al. .............. 464/128 |
| 6,077,166 A | | 6/2000 | Reynolds |
| 6,264,566 B1 | * | 7/2001 | Nieman et al. ............. 464/132 |

(Continued)

FOREIGN PATENT DOCUMENTS

DE 2 047 420 3/1972

(Continued)

OTHER PUBLICATIONS

Mancuso, Jon R., Couplings and Joints, 2 ed., New York, Marcel Dekker, Inc., p. 381, TJ183.M36 1999.*

*Primary Examiner*—Greg Binda
(74) *Attorney, Agent, or Firm*—MacMillan, Sobanski & Todd, LLC

(57) ABSTRACT

A bearing assembly for a bearing journal (13), especially of a cross member of a universal joint, has a bearing journal (13) with a cylindrical outer face (14), an end face (16) and a journal axis (15). A bearing element (8) has a cylindrical bearing bore (9) with a bottom face (11) and a running face (10) which is arranged at a radial distance from the outer face (14) of the bearing journal (13). Rolling-contact members (17), at their respective ends, include at least partially planar first end face (18) and second end face (19). The faces (18) and (19) are arranged between the running face (10) and the outer face (14). A stop face (20) includes an annular contact face (21) for the first end face (18) of the rolling-contact members (17). A pressure disk (22) is included with a disk portion (23) arranged between the end face (16) of the bearing journal (13) and the bottom face (11). A supporting portion (24) radially follows the disk portion (23) with reference to the journal axis (15). The supporting portion (24) is contacted by the second end faces (19) of the rolling-contact members (17). The supporting portion (24) is designed to be resilient.

6 Claims, 5 Drawing Sheets

U.S. PATENT DOCUMENTS

| | | |
|---|---|---|
| 6,336,868 B1 | 1/2002 | Kurecka et al. |
| 2003/0040368 A1 * | 2/2003 | Schultze et al. ............ 464/131 |

FOREIGN PATENT DOCUMENTS

| | | |
|---|---|---|
| DE | 31 15 659 A1 | 11/1982 |
| DE | 86 31 594.3 | 2/1987 |
| DE | 36 22 657 A1 | 1/1988 |
| DE | 90 14 393.0 | 2/1991 |
| DE | 299 20 839 U 1 | 3/2000 |
| JP | 61-184224 | 8/1986 |

\* cited by examiner

BEARING ASSEMBLY FOR A JOURNAL, ESPECIALLY OF A CROSS MEMBER OF A UNIVERSAL JOINT

CROSS-REFERENCE TO RELATED APPLICATIONS

This application claims priority to German Patent Application No. 10155761.2 filed Nov. 14, 2001, which application is herein expressly incorporated by reference.

FIELD OF THE INVENTION

The invention relates to a bearing assembly for a bearing journal of a cross member of a universal joint.

BACKGROUND OF THE INVENTION

A bearing assembly is described in U.S. Pat. No. 6,077,166 A. The bearing journal has a cylindrical outer face, an end face and a bearing axis. A bearing element is placed onto the bearing journal. The bearing element has a cylindrical bearing bore with a bottom face and a running face. The running face is arranged at a radial distance from the outer face of the bearing journal. Rolling contact members are positioned between the bearing journal and the bearing element. The rolling-contact members are cylindrical along at least part of their length. The rolling contact members, at their ends, have a planar first end face and a planar second end face. The end faces are arranged between the running face and the outer face around the bearing journal to form a collar.

A seal attached to a metallic carrier is inserted into the open end of the bearing bush. The metallic carrier has a web angled towards the journal axis and forms an annular contact face for the first end face of the rolling-contact members. A pressure disk is positioned between the end face of the bearing journal and the bottom face of the bearing bush. The pressure disk is fully supported on the bottom face and on the end face. The pressure disk projects radially and axially into the gap between the running face of the bearing bush and the outer face of the bearing journal. The pressure disk serves as a supporting face for the second planar end face of the rolling-contact members. Since the dimensions determining the distance between the running face of the stop ring and the supporting face of the pressure disk include tolerances, it is not guaranteed that the rolling-contact members are guided in a play-free manner in the axial direction, parallel to the journal axis.

SUMMARY OF THE INVENTION

It is an object of the present invention to provide a bearing assembly which ensures that, in spite of the existence of tolerances, the rolling-contact members are guided sufficiently and securely.

In accordance with the invention, a bearing assembly for a bearing journal of a cross member of a universal joint has a bearing journal with a cylindrical outer face, an end face and a journal axis. A bearing element has a cylindrical bearing bore with a bottom face and a running face arranged at a radial distance from the outer face of the bearing journal. Rolling-contact members are cylindrical along at least part of their length. The ends of the rolling contact elements have at least partially planar first end face and second end face. The rolling contact members form a collar around the bearing journal between the running face and the outer face.

A stop ring is axially secured at the bearing journal or in the bearing bore. The stop ring has an annular contact face for the first end face of the rolling-contact members.

A pressure disk has a disk portion arranged between the end face of the bearing journal and the bottom face. Also, the pressure disk has a supporting portion which radially adjoins the disk portion with reference to the journal axis. The supporting portion is contacted by the second end faces of the rolling-contact members. The supporting portion is designed so as to be resilient.

The assembly in accordance with the invention achieves a kind of rim guidance for the rolling-contact members which continue to be aligned parallel to the journal axis. This prevents the rolling-contact members from jamming. During the to- and fro-movement, it is possible to achieve a rolling-contact movement of the rolling-contact members between the outer face of the bearing journal and the running face of the bearing bore. Due to the resilient arrangement, this kind of guidance can be maintained across a large tolerance range. In addition, a better load distribution and a longer service life is achieved. The supporting portion is designed so that, at least along the journal axis, it provides spring travel.

In order to achieve a sufficiently high supporting force, the supporting portion is formed integral with the disk portion. The supporting portion includes a reinforcing insert made of metal or plastics. Alternatively, the supporting portion may be in the form of a Belleville-spring-like metal ring connected to the disk portion. For example, the Belleville-spring may be partially embedded in the disk portion which can be produced from plastics. The material for the disk portion and for the parts of the supporting portions connected thereto is preferably a polyamide material (PA). The PA material may be reinforced by fibers for instance and into which it is possible to embed friction-reducing lubricant constituents, such as molybdenum disulphide. As a result, it is possible to reduce the friction between the bottom face of the bearing element and the end face of the bearing journal and also between the rolling-contact members and the supporting face of the supporting portion. The stop ring may also include a coating of the above-mentioned material.

The supporting face of the supporting portion is continuous and provides contact with the second end faces of the rolling-contact members. The supporting face can have a curved cross-section.

According to a further embodiment, in order to delimit the spring travel of the supporting portion, it may stop against the bottom face. This provides effective support in case the axial forces during operation or assembly are too high. By limiting the free space, it is possible, when pressing the bearing element in the form of a bearing bush, to limit the distances which can be covered by the supporting portion. Thus, latter cannot be impermissibly deformed. The deformation behavior and the spring properties can also be advantageously influenced by an embodiment which includes the reinforcing insert in the form of a disk. The circumference of the disk includes a plurality of slots. The slots form first and second sectors. The first sectors, in order to provide support, are bent relative to the second sectors. The second sectors include the supporting face for the second end faces of the rolling-contact members. The reinforcing insert can also be a metal disk. In this case, the supporting face is fully continuous.

In a preferred embodiment, at least one disk portion is made of plastics. Furthermore, it is possible for the bearing element to be formed by a yoke arm of a joint yoke of a universal joint. The bearing bore is worked directly into the yoke arm. The bearing element, in the form of an individual part, can also be connected to a flange. Thus, two such bearing units, together with the flange, provide a kind of yoke that receives the two bearing journals of a cross member that are arranged on one axis.

According to a further embodiment, the bearing element is formed by a bearing bush. The bearing bush is received in a bore of a yoke arm of a joint yoke of a universal joint.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
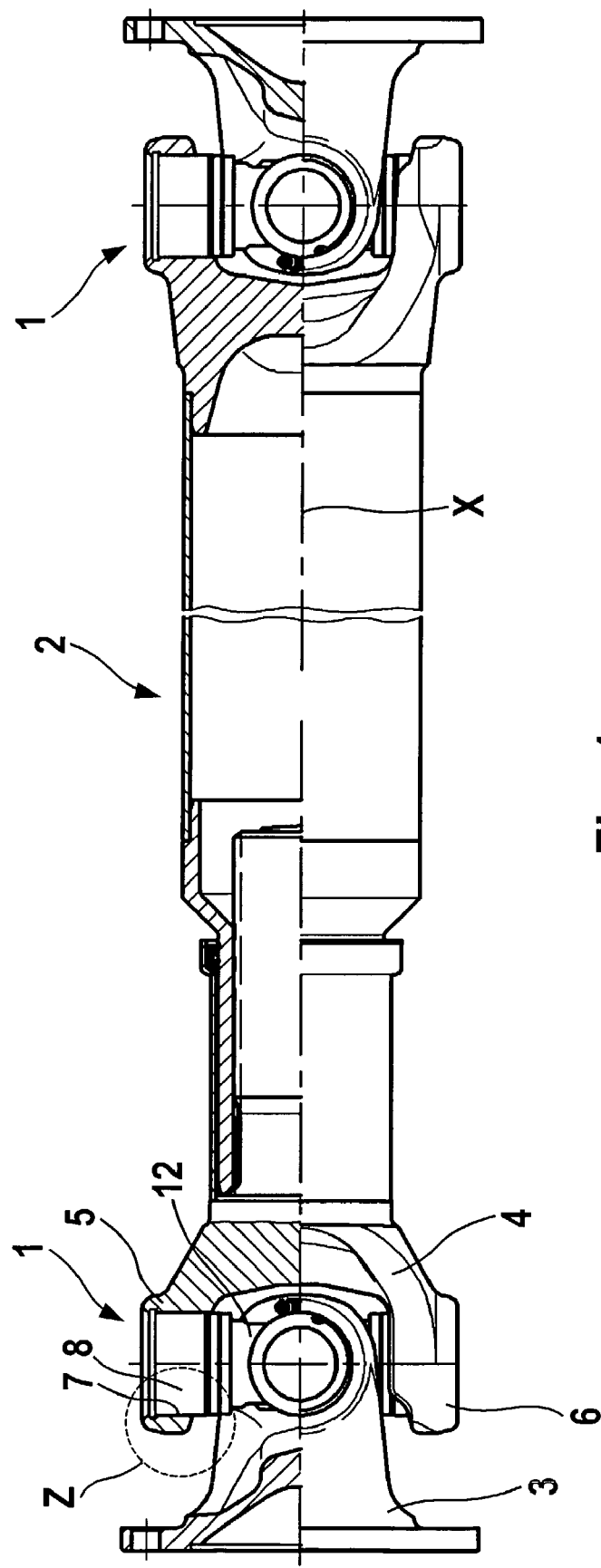
FIG. 1 is a side view of a drive shaft with two universal joints and a plunging unit.

FIG. 1 shows a drive shaft with two universal joints 1 at the ends of a plunging unit 2. The individual parts are centered and arranged on the longitudinal axis X. The two universal joints may be identical, so that only one universal joint 1 needs to be described in detail. The universal joint 1 has a first joint yoke 3 and a second joint yoke 4. The first joint yoke 3 is connected to a flange. The second joint yoke is connected to one end of the plunging unit 2. If changes in angle occur between the two universal joints 1 at the ends of the plunging unit 2, the latter enables a change in length between the articulation centers of the universal joints 1.

The second joint joke 4 has a first yoke arm 5 and a second yoke arm 6. The arms 5 and 6 are arranged at a distance from one another and are symmetrically positioned relative to the longitudinal axis X. The two yoke arms are identical with respect to receiving a cross member 12 which articulately connects them. Thus, the assembly will be described only with reference to one yoke arm, the first yoke arm 5.

The first yoke arm 5 has a bore 7 accommodating a bearing bush that forms a bearing element 8 in the sense of the invention. However, it is also possible for the yoke arms themselves to form the bearing element. Thus, the bearing bore 9 in the bearing element 8, in the form of a bearing bush, in connection with the bearing assembly according to FIG. 2, can directly be part of the first yoke arm 5, it can replace the bore 7.

Below, reference will be made to the description of the bearing assembly of FIG. 2 which shows a detail of FIG. 1. The bearing bore 9 forms a cylindrical running face 10. Furthermore, the bearing element 8, in the form of the bearing bush, is closed at one end by a bottom face 11. The bearing element 8 accommodates a bearing journal 13. The bearing journal 13, with reference to the journal axis 15, has a circular-cylindrical outer face 14. The bearing journal 13 also includes an end face 16 which extends at a right angle relative to the outer face 14.

Rolling contact members 17 are provided in the annular gap between the running face 10 and the outer face 14. The rolling contact members 17 adjoin one another in a row around the bearing journal 13 and thus form a collar. At least along a considerable part of their length, the rolling contact members 17 are cylindrical. Thus, the rolling contact members 17 are held between the outer face 14 and the running face 10 to carry out a rolling-contact movement. The rolling contact members 17, towards their open ends, each include a first end face 18 and towards the bottom face 11, they include a second end face 19.

A stop ring 20 is positioned in the region of the open end of the bearing element 8. The stop ring 20 is positioned in the bearing bore 9. The stop ring 20 includes a contact face 21 for the first end face 18 of the rolling-contact members 17. As illustrated, the stop ring 20 can form part of a seal and can be firmly arranged relative to the bearing element 8 in the axial direction. The stop ring 20 can also be held on the bearing journal 13.

A pressure disk 22 is positioned between the end face 16 of the bearing journal 13 and the bottom face 11 of the bearing element 8. The pressure disk 22 will be described in more detail in connection with the remaining Figures. FIG. 2 shows a first embodiment of the pressure disk.

The pressure disk 22 guides the rolling-contact members 17. The pressure disk 22 has a disk portion 23 that is made of plastic and is arranged between the end face 16 of the bearing journal 13 and the bottom face 11. The bottom face 11 of the bearing element 8 has a recessed area that extends thereabout adjacent to the running face 10. The disk portion 23 holds and centers the cross member with the bearing journal 13 in the direction of the journal axis 15. The disk portion 23 is followed, in the radial direction with reference to the journal axis 15 of the bearing journal 13, by a supporting portion 24. The supporting portion 24 is integral with the disk portion 23. The supporting portion 24 extends towards the bottom face 11 away from the journal axis 15. The distance between the bottom face 11 and journal axis 15 continuously increases.

The supporting portion 24 includes a supporting face 26 with a curved cross-section. The supporting face 26 rests against the second end face 19 of the rolling members 17 and guides the same. The supporting portion 24 with the supporting face 26 is designed so that it provides a spring travel along the journal axis 15. Thus, the supporting portion 24 is able to offset any tolerances which cause variations in length of the rolling-contact members 17 in the longitudinal direction. In this way, contact and guidance of the rolling-contact members 17 is always ensured because the contact face 21 contacts the first end faces 18 and the supporting face 26 contacts the second end faces 19 of all rolling-contact members 17. The rolling-contact members 17 are thus held under a certain amount of axial pretension. Thus, the rolling contact members 17 are guided in a play-free manner. This ensures perfect rolling-contact conditions. Thus, a kind of rim guidance is provided for the rolling-contact members 17 which are also maintained if tolerance deviations occur. However, the spring travel of the supporting portion 24 is delimited by the supporting portion 24 abutting the bottom face 11 of the bearing element 8.

Figure 2:
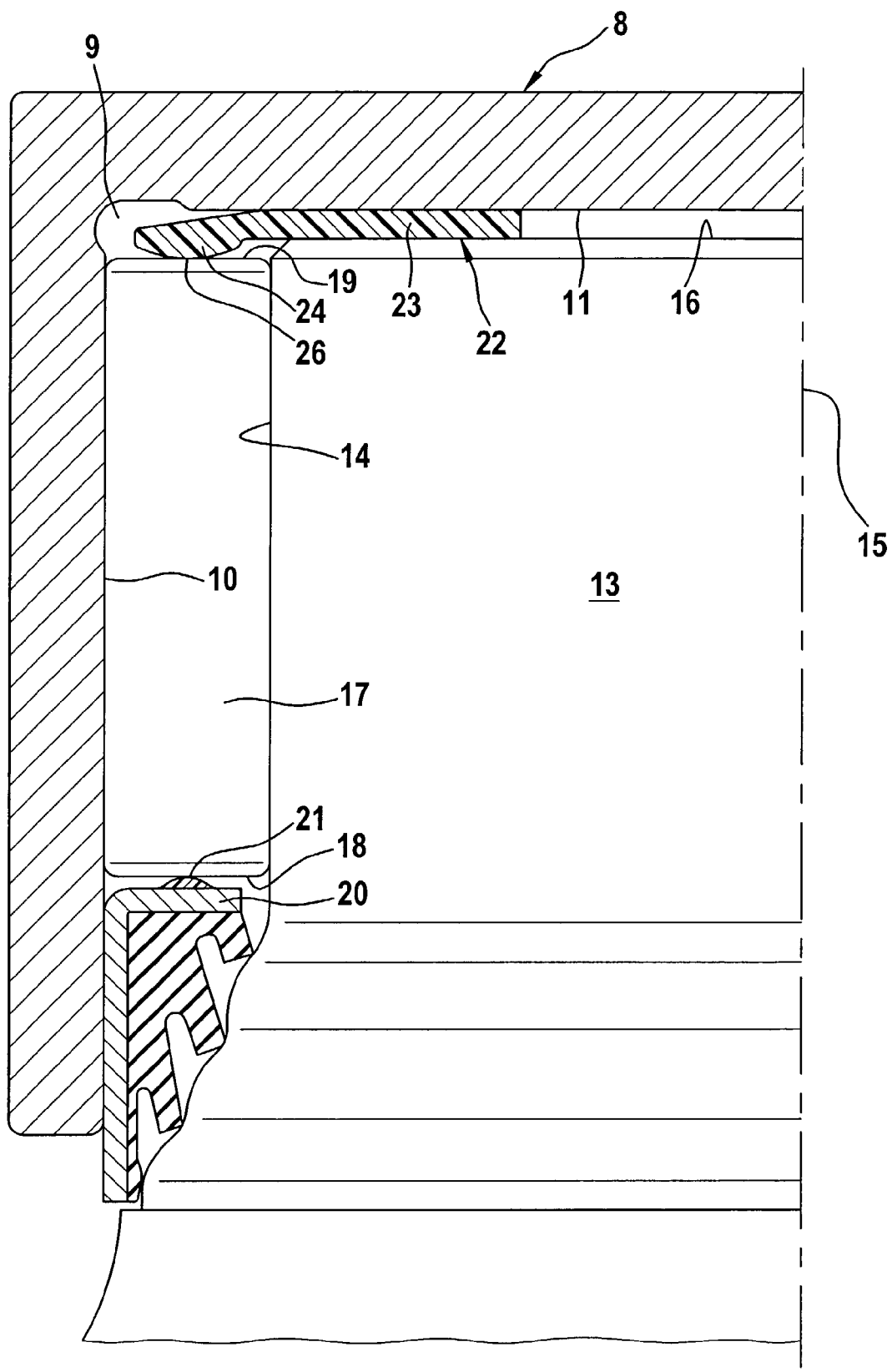
FIG. 2 shows the detail Z of FIG. 1 in a cross-sectional view and in an enlarged scale relative to a first embodiment of the bearing assembly.

According to FIG. 2, the pressure disk 22 is provided as an integral design. The disk portion 23 and the supporting portion 24 are one and the same material.

Figure 3:
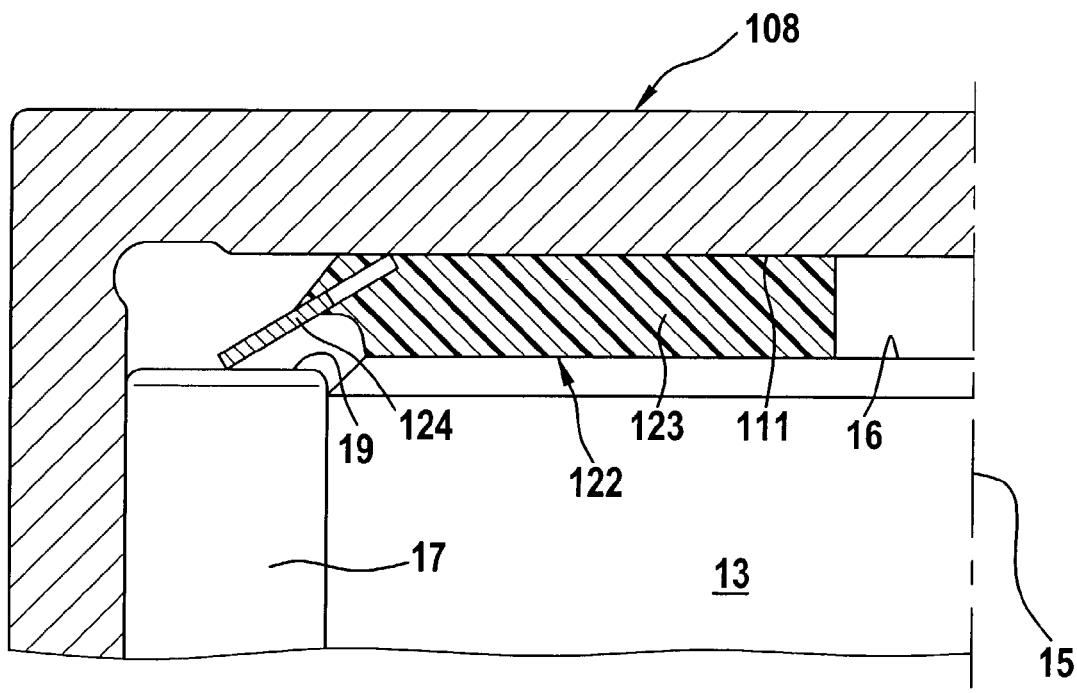
FIG. 3 is a cross-sectional view of a further embodiment with a pressure disk including a Belleville-spring-like supporting portion.

In the pressure disk embodiment according to FIG. 3, the functions are divided. Reference numbers are used which apply to parts identical to those shown in FIG. 2. In the case of those parts which are only similar or have a similar effect, the reference numbers have been increased by the value 100. The deviations of the embodiment according to FIG. 3 relative to those of FIG. 2 will be described in greater detail below.

In the pressure disk 122, the disk portion 123 is made of plastic. A partially embedded saucer-spring-like (Belleville-spring-like) supporting portion 124 is formed into the disk portion 123. The free end on the supporting portion rests against the second end face 19 of the rolling-contact member 17. The saucer-spring-like supporting portion 24 enables higher forces to be generated if it is formed of a saucer spring made of metal.

Figure 4:
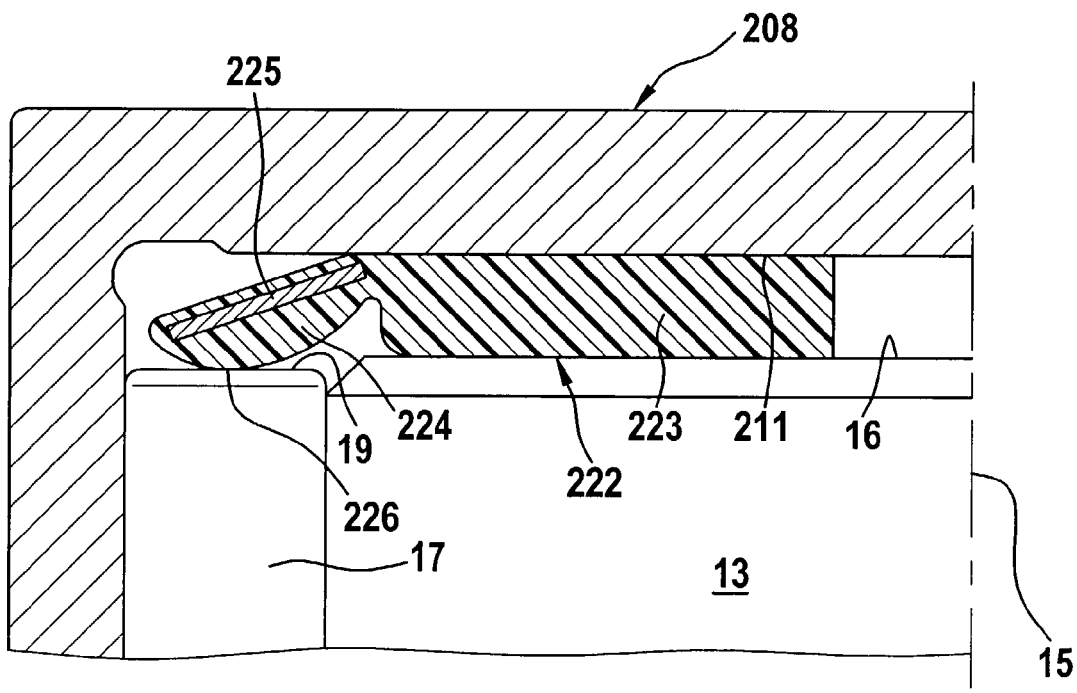
FIG. 4 is a cross-sectional view of a modified embodiment of a bearing assembly with a pressure disk including a reinforcing insert in the region of the supporting portion.

In the embodiment according to FIG. 4, those parts identical to FIGS. 1 to 3 have been given the same reference numbers, with the reference numbers of any deviating parts having been increased by the value 100 as compared to FIGS. 1 to 3.

A pressure disk 222 includes a disk portion 223. The disk portion 223 continues into the supporting portion 224. A plate-spring-like reinforcing insert 225 is embedded in the supporting portion 224 and extends into the disk portion 223. The reinforcing insert 225, whose distance from the journal axis 15 is smaller, is positioned close to the bottom face 211. Thus, this position ensures good supporting conditions if, parallel to the journal axis, forces are applied to the curved supporting face 226 of the supporting portion 224.

Figure 5:
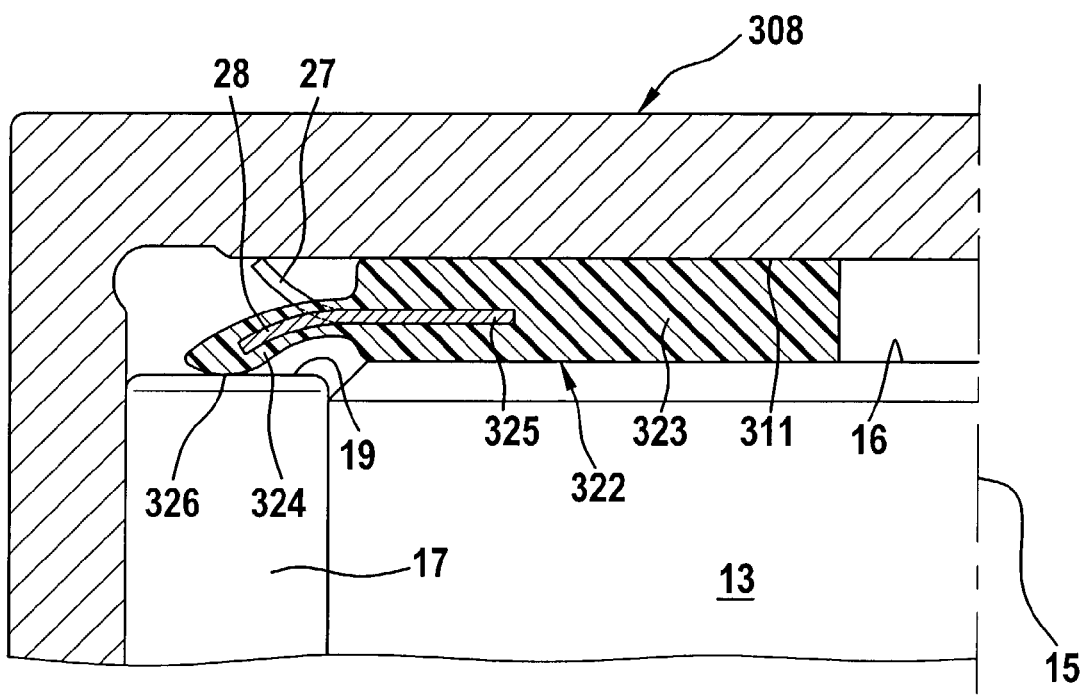
FIG. 5 is a cross-sectional view of an embodiment where the pressure disk also includes a reinforcing insert from a disk divided into sectors.

In the embodiment according to FIG. 5, any components which are identical to those shown in FIGS. 1 and 2 have been given the same reference numbers. The deviating design of the pressure disk and of the bearing element is indicated by the fact that their reference numbers have been increased by the value 300 as compared to the respective parts in FIGS. 1 to 3.

The bearing element 308 is in the form of a bearing bush. The bearing bush has an indentation in the form of a groove in the region between the bottom face 311 and the running face. The groove avoids notch effects and simplifies machining of the bottom face 11 and of the running face. The pressure face 322 has a disk portion 323 made of plastic. The disk portion 323 is followed by a supporting portion 324 which extends radially away from the journal axis 15. The supporting portion 324 is formed integral with the disk portion 323 made of plastic. However, the supporting portion 324 is reinforced by a reinforcing insert.

The reinforcing insert includes a disk-like portion. The disk like portion extends into the disk portion 323. The portion projecting radially from the disk portion 323 is divided into segments. The metallic reinforcing insert 325 is slotted on its circumference. Circumferentially distributed first sectors 27 are produced and angle towards the bottom face 311, which they are supported on. Second sectors 28 are arranged between each two first sectors 27. The second sectors 28 are angled away from the bottom face 311. The second sectors 28 are embedded in the plastic supporting portion 324. In order to contact the second end faces 19 of the rolling-contact members 17, the second sectors 28 include a continuous supporting face 326. The supporting face 326 has a curved cross-section.

Figure 6:
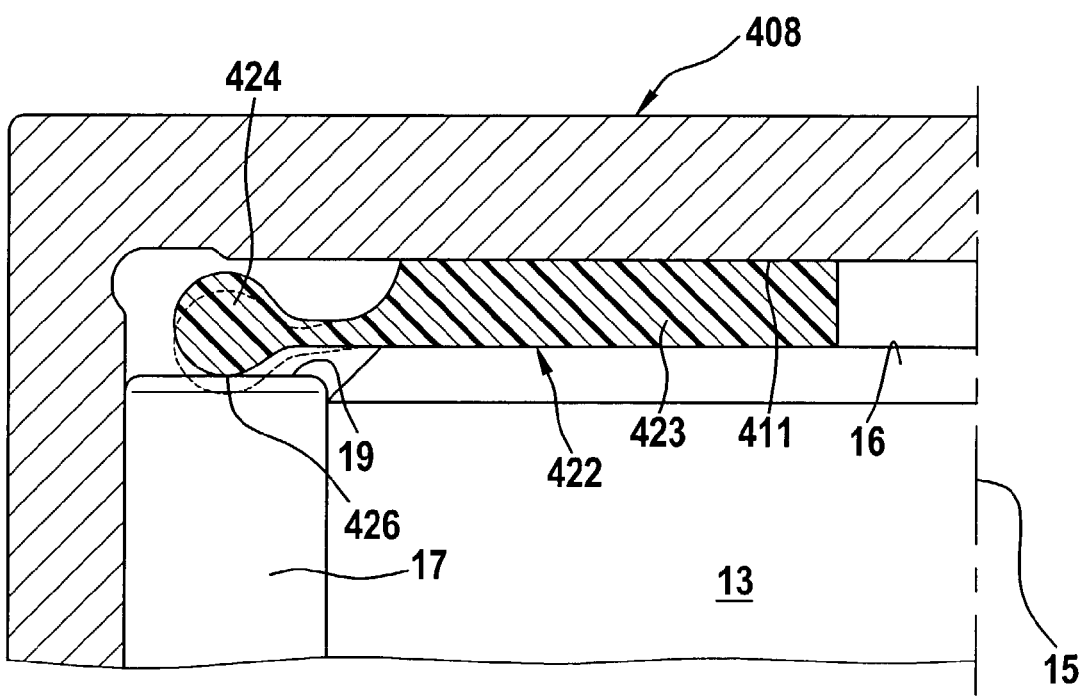
FIG. 6 is a cross-sectional view of an embodiment wherein the supporting portion and the disk portion of the pressure disk are provided in one piece and wherein the spring travel of the supporting portion is limited.

In the embodiment according to FIG. 6, again any components which are identical to those in the embodiments according to FIGS. 1 to 3 have been given the same reference numbers. The deviating components have been given reference numbers whose value has been increased by 400 relative the corresponding parts in the embodiments to FIGS. 1 and 2.

The bearing element includes a bearing bore with a curvature in the region of abutment between the running face and the bottom face 411. The pressure disk 422 includes a plastic disk portion 423 between the bottom face 411 and the end face 16. In the radial direction with reference to the journal axis 15, the disk portion 423 is first followed by a thinned portion. The disk portion 423 is thinned in a direction parallel to the journal axis 15.

The disk portion 423 changes into a thickened supporting portion 424. The supporting portion 424 includes the supporting face 426 with the curved cross-section. The supporting portion 424 and the disk portion 423 are one piece. In addition, dashed lines indicate the normal position, the untensioned condition. The continuous line shows the contour of the supporting portion 424 in the built-in condition after assembly.

The spring travel of the supporting portion 424 that extends parallel to the journal axis 15 is delimited by the face of the supporting portion 424 facing away from the supporting face 426 which comes to rest against the bottom face 411. Accordingly, the region between the supporting portion 424 and the disk portion 423, which provides the spring characteristics, is prevented from being overloaded when the bearing element 408 is slid on to the bearing journal 13. The spring characteristics of the supporting portion can be changed by reinforcing layers out of a glass fiber or carbon fiber material. The fibers may be embedded in the base material of the pressure disk 422. It is also possible to add a percentage of fiber.

Figure 7:
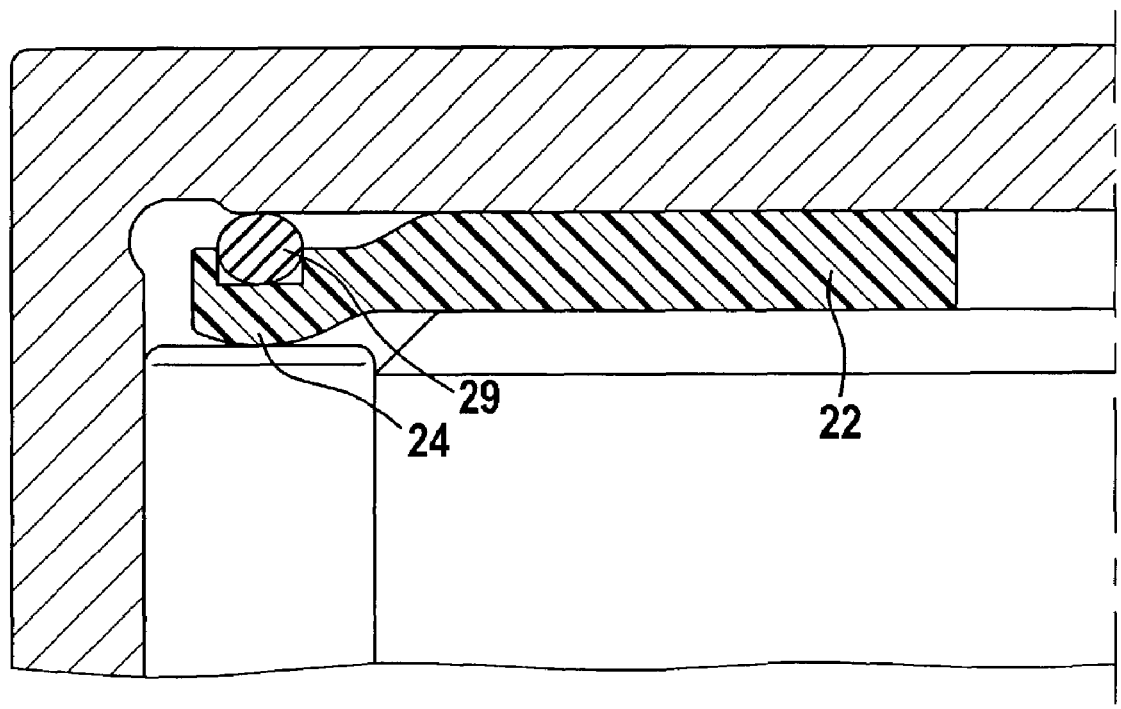
FIG. 7 is a cross-sectional view of a modification of FIG. 2, wherein, for supporting purposes, a ring is associated with the supporting portion of the pressure disk.

In FIG. 7, which has been modified relative to FIG. 2, the supporting portion 24 can be associated with a ring 29. The ring 29 supports the permanently elastic springiness of the pressure disk 22.

While the above description of the invention is merely exemplary in nature and, thus, variations that do not depart from the gist of the invention are intended to be within the scope of the invention. Such variations are not to be regarded as a departure from the spirit and scope of the invention.

What is claimed:

1. A bearing journal and element assembly comprising:
a bearing journal having an outer face and an end face;
a bearing element having a bearing bore that defines a bottom face and a running face, the bottom face having a recessed area that extends thereabout adjacent to the running face, the bearing journal being disposed within the bearing bore;

rolling-contact members disposed between the running face of the bearing element and the outer face of the bearing journal, each of the rolling-contact members having a first end face and a second end face;

a stop ring that is axially secured at the bearing journal or in the bearing bore, the stop ring including a contact face that engages the first end faces of the rolling-contact members; and a pressure disk including a disk portion that is disposed between the end face of the bearing journal and the bottom face of the bearing element and a supporting portion that is disposed between the second end faces of the rolling-contact members and the bearing element, the supporting portion having spring travel so as to resiliently contact the second end faces of the rolling-contact members, wherein a first portion of the supporting portion of the pressure disk is disposed between the second end faces of the rolling-contact members and the non-recessed area of the bottom face of the bearing element and a second portion of the supporting portion of the pressure disk is disposed between the second end faces of the rolling-contact members and the recessed area of the bearing element, wherein the spring travel of the supporting portion is delimited by the supporting portion abutting the bottom face of the bearing element.

2. A bearing journal and element assembly according to claim 1, wherein the supporting portion includes a continuous supporting face which establishes contact with the second end face of the rolling-contact members.

3. A bearing journal and element assembly according to claim 2, wherein the supporting face has a curved cross-section.

4. A bearing journal and element assembly according to claim 1, wherein at least the disk portion of the pressure disk is made of plastic.

5. A bearing journal and element assembly according to claim 1, wherein the bearing element is formed by a yoke arm of a joint yoke of a universal joint.

6. A bearing journal and element assembly according to claim 1, wherein the bearing element is formed by a bearing bush received in a bore of a yoke arm of a joint yoke of a universal joint.

* * * * *